US005681467A

United States Patent [19]
Solie et al.

[11] Patent Number: 5,681,467
[45] Date of Patent: Oct. 28, 1997

[54] METHOD FOR FORMING A MEMBRANE INTO A PREDETERMINED SHAPE

[75] Inventors: Greg D. Solie, Chaska; Matthew J. Hallan, Savage, both of Minn.

[73] Assignee: The Dow Chemical Company, Midland, Mich.

[21] Appl. No.: 716,044

[22] Filed: Sep. 19, 1996

[51] Int. Cl.⁶ ............................................. B01D 39/00
[52] U.S. Cl. .................. 210/486; 210/493.1; 210/493.4; 156/202; 156/228; 156/309.9; 156/582
[58] Field of Search ........................ 210/493.1, 486, 210/493.4, 493.5, 497.1, 652, 490, 321.74; 156/228, 309.9, 202, 582; 264/45.1, 46.2, 46.3

[56] References Cited

U.S. PATENT DOCUMENTS

| | | | |
|---|---|---|---|
| 4,252,591 | 2/1981 | Rosenberg | 210/493.5 |
| 4,277,344 | 7/1981 | Cadotte | 210/654 |
| 4,707,265 | 11/1987 | Barnes, Sr. et al. | 210/490 |
| 4,842,736 | 6/1989 | Bray et al. | 210/321.6 |
| 4,928,334 | 5/1990 | Kita | 156/202 |
| 5,338,382 | 8/1994 | Johnson et al. | 156/202 |

*Primary Examiner*—Ana Fortuna

[57] ABSTRACT

A thin film membrane formed to a predetermined shape is produced by bending the membrane to create a loop and softening the membrane that makes up the loop with either thermal energy or a swelling solvent. The softened loop is then drawn between plates or about a mandrel to form a membrane with a predetermined fold radius. The fold region produced by the method of the instant invention does not require an adhesive sealant to prevent unfiltered liquid from diffusing through the membrane. The method is especially well suited for preparing membranes for use in the production of spiral wound filters.

23 Claims, 4 Drawing Sheets

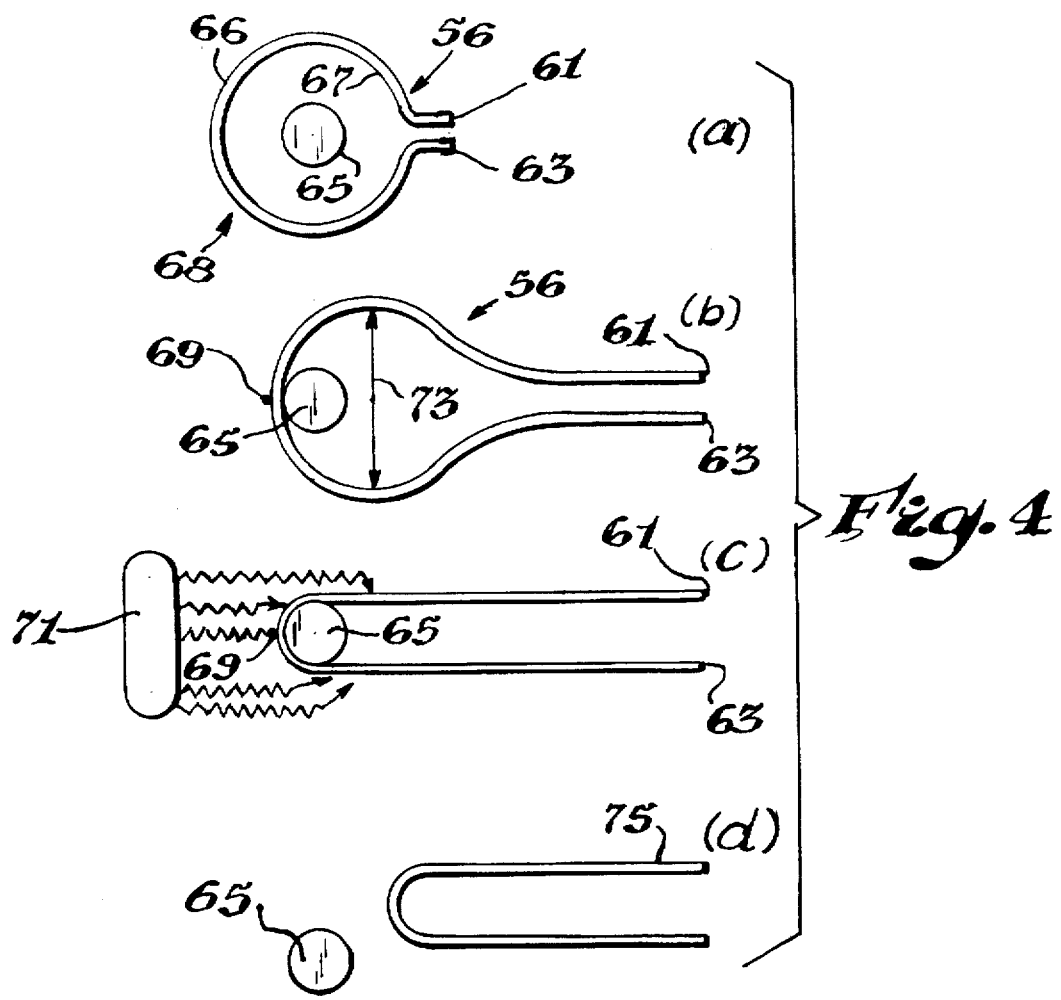
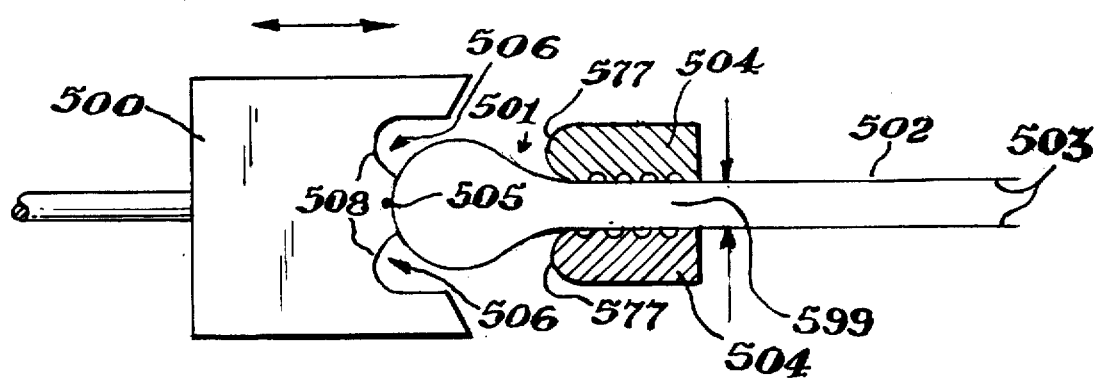

METHOD FOR FORMING A MEMBRANE INTO A PREDETERMINED SHAPE

BACKGROUND OF THE INVENTION

1. Field of the Invention

This invention relates to a method for the forming of a membrane into a predetermined shape. More particularly, the present invention concerns a method for folding a laminar membrane for use in the fabrication of spiral wound membrane elements used for reverse osmosis or for nano-, ultra- or microfiltrations.

2. Description of the Prior Art

Membrane technology is widely used to perform separations of solutes and particulates from liquid phase systems. Liquid separation, ultra-filtration and reverse osmosis are fields that rely on highly controlled membrane properties to exact separation of a liquid system into permeate and retentate fractions. The applications of membranes illustratively include water purification, dairy processing, sweetener processing, water desalinization, and the concentration of dilute solutes and particulates. A conventional, efficient design for incorporating large surface areas of membrane into a small volume is the use of a spiral wound filter cartridge. Two types of spiral wound filters commonly used are sandwich and petal leaf.

A conventional sandwich spiral wound filter is described in reference to FIG. 1. A conventional sandwich spiral wound filter is wound about a central permeate collection tube 10 having holes 11 for liquid transport. The collection tube 10 is wound with a sheet of permeate spacer material 12 such that the free end of the permeate spacer material sheet 12a extends far enough from the central tube 10 to equal or slightly exceed the length of an adjacent sandwich 20a, upon flattening the free end of the supporting material sheet 12a against the sandwich 20a. The sandwich 20a is composed of folded membrane 25a and feedstock channel layer 30a nested within the membrane leaves 25a' and 25a". The permeate spacer material 12 is usually affixed to the central tube by means of an adhesive (not shown). The sandwich 20a is affixed to the supporting material 12 wrapping the central tube 10 by means of an adhesive (not shown). The adhesive is placed along the juncture between the membrane leaves 25a', 25a" and the wrapped supporting layer 12. A plurality of such sandwiches 20a, 20b, 20c, 20d (only four shown for clarity of illustration purposes) are distributed about the central tube 10 and affixed to the supporting material wrapping layer 12 as described in regard to 20a. The sandwich 20a is typically affixed to the supporting layer so as to extend radially outward from the central tube 10. Interspersed between the sandwiches 20a, 20b, 20c, 20d, sheets of permeate spacer material 22b, 22c, 22d are similarly affixed to the permeate spacer material wrapping layer 12 so as to extend radially outward far enough to equal or slightly exceed the length of the adjacent sandwich upon flattening against the adjacent sandwich. The plurality of sandwiches 20a, 20b, 20c, 20d and the sheets of permeate spacer material 12a, 22b, 22c, 22d are not required to be of the same length, but frequently are of standardized length for ease of production. The radially extending permeate spacer material 12a, 22b, 22c, 22d and sandwiches 20a, 20b, 20c, 20d are then rolled flat against the central tube 10 to form the spiral wound filter assembly. The filter is placed in a housing (not shown) and connected to an inlet that admits pressurized feedstock to the exterior of the spiral wound filter assembly and the central tube 10 is connected to an outlet for the removal of permeate solution that is driven through the cartridge by the pressure gradient. A second outlet provides for the collection of permeate poor retentate.

A conventional petal leaf spiral wound filter is described in reference to FIG. 2. A conventional petal leaf spiral wound filter contains a central permeate collection tube 100 having holes for liquid transport (not shown), at least one accordion folded sheet of membrane 120, permeate spacer sheets and feedstock spacer sheets. The central tube 100 is wound with a sheet of permeate spacer material 112 such that the free end of the permeate spacer sheet 112a extends far enough from the central tube 100 to be about the same length as the first folded leaf 121 of the membrane. The edge of the supporting layer 122 of the first folded leaf 121 is sealed to the free end of the permeate spacer sheet. The accordion folds of the membrane are alternately affixed 123 to the permeate spacer material 112 about the diameter of the central tube 100. The final fold 127 is sealed to the free end of the permeate spacer sheet and the first folded leaf of the membrane 121 to form a closed petal leaf. Typically the active layer of the membrane 125 is on the exterior surface of the closed petal leaf. Interspersed between adjacent affixed folds of membrane, sheets of permeate spacer material 124 are similarly affixed to the permeate spacer material 112. The sheets of permeate spacer material 124 are typically long enough to just fill the crease between adjacent affixed folds of membrane. Feedstock spacer sheets 128 are interspersed between free folds 129 of the membrane. The membrane and interspersed sheets are then rolled flat against the central tube and inserted into a housing for use as described in regard to a spiral wound filter.

Membranes that are useful for the separations described above typically have a thin active layer and a relatively thick supporting layer. An additional supporting layer is optionally adjoining the supporting layer, to further adjust the membrane properties. The active layer is preferably an aromatic polyamide, most preferably one that is prepared from a monocyclic di-primary amine such as phenylene diamine and a monocyclic di- or tri-acid chloride such as trimesoyl chloride. The preferred supporting layer is prepared from organic polymeric materials such as polysulfone, polyvinyl chloride, polyvinyl butyral, polystyrene, cellulose esters and other organic polymeric materials that may be made with pore densities of millions of pores per square centimeter. An additional supporting layer is preferably a flexible, porous, organic mat material which is composed of micron diameter fibers. The properties and preparation of such membranes are detailed in U.S. Pat. No. 4,277,344, which is incorporated herein by reference.

The reliability and the selectivity of conventional filter cartridges are detrimentally effected by defects introduced into the membrane by folding. Normally, folding or otherwise deforming the membrane produces microcracks which allow for the seepage of feed liquid through the membrane to the central tube. In order to minimize the deleterious effects of microcracks, adhesive sealant compounds have been employed to prevent any seepage or membrane transport through those regions of membrane characterized by a severe angle of curvature, as detailed in U.S. Pat. No. 4,842,736.

While adhesive sealants are successful in lessening leakage through the creased portions of the membrane, their use creates a new set of technical problems. The application of sealant reduces the active layer surface area available for performing separations. The application of adhesive sealants is also labor intensive and through the additional handling associated with applying sealants, damage to the active membrane layer occurs, thereby increasing the product rejection rate. In addition, sealant curing is a time consuming process which greatly slows product throughput. Furthermore, many sealants do not meet Food and Drug Administration requirements for leachables and are unacceptable in food and dairy applications.

The problem of microcracking is largely overcome by the use of adhesive sealants, but at the expense of reduced production efficiency. As such, it is an object of the current invention to form a membrane to a predetermined shape and in so doing avoid the formation of microcracks and thereby eliminate the need for adhesive sealants.

SUMMARY OF THE INVENTION

This invention is a method for folding a polymeric membrane comprising: forming a polymeric membrane, having a supporting layer, an active layer, a front end and a back end, into a loop; softening said loop by means of a softening source until said loop is adapted for drawing down to a formed shape; drawing said loop to said formed shape; and removing said formed shape from said softening source.

A membrane having a front edge, a back edge and a supporting layer and an active layer is flexed to form a loop. The loop is created by either bringing the front edge and back edge into proximity and or by bringing either the active layer or supporting layer into coplanar opposition to itself, such that either layer defines a convex or concave surface. The diameter of the loop is sufficiently large that stress cracking does not result. The membrane material comprising the loop is then softened and the loop diameter reduced at a rate dictated by the malleability of the softened membrane material comprising the loop. The membrane material comprising the loop is softened by: heating to between 90 and 120 percent of the glass transition temperature in degrees Kelvin of the active layer or swelling the membrane material with a solvent. For the preferred polyamide membranes, the glass transition temperatures generally range from 350° K. to about 380° K. The loop is then drawn to a predetermined shape. Upon configuring the loop to predetermined shape, the membrane material is cooled to less than 85 percent of the glass transition temperature in degrees Kelvin or dried, respectively. The predetermined shape in regard to final loop diameter and the relative orientation of the front edge and back edge of the membrane is maintained upon cooling or drying. A small loop diameter results without the cracking and defects associated with conventional folding methods, thereby eliminating the need for adhesive sealants. The membrane in a predetermined shape is optionally annealed to reduce stresses internal to the membrane.

The invention as described herein is generally useful in forming thin polymeric films to a predetermined shape and specifically useful for forming membranes to a predetermined shape for the production of spiral wound filters of either a sandwich or petal leaf configuration.

BRIEF DESCRIPTION OF THE DRAWINGS

FIG. 4 is a schematic diagram illustrating a second embodiment of the invention for forming a membrane into a predetermined shape about a mandrel. Various components are not shown to scale for visual clarity.

FIG. 5 is a schematic diagram illustrating a scoop adapted to force membrane through a constricting space so as to form the membrane into a predetermined shape. Various components are not shown to scale for visual clarity.

DETAILED DESCRIPTION OF THE INVENTION

Figure 1:
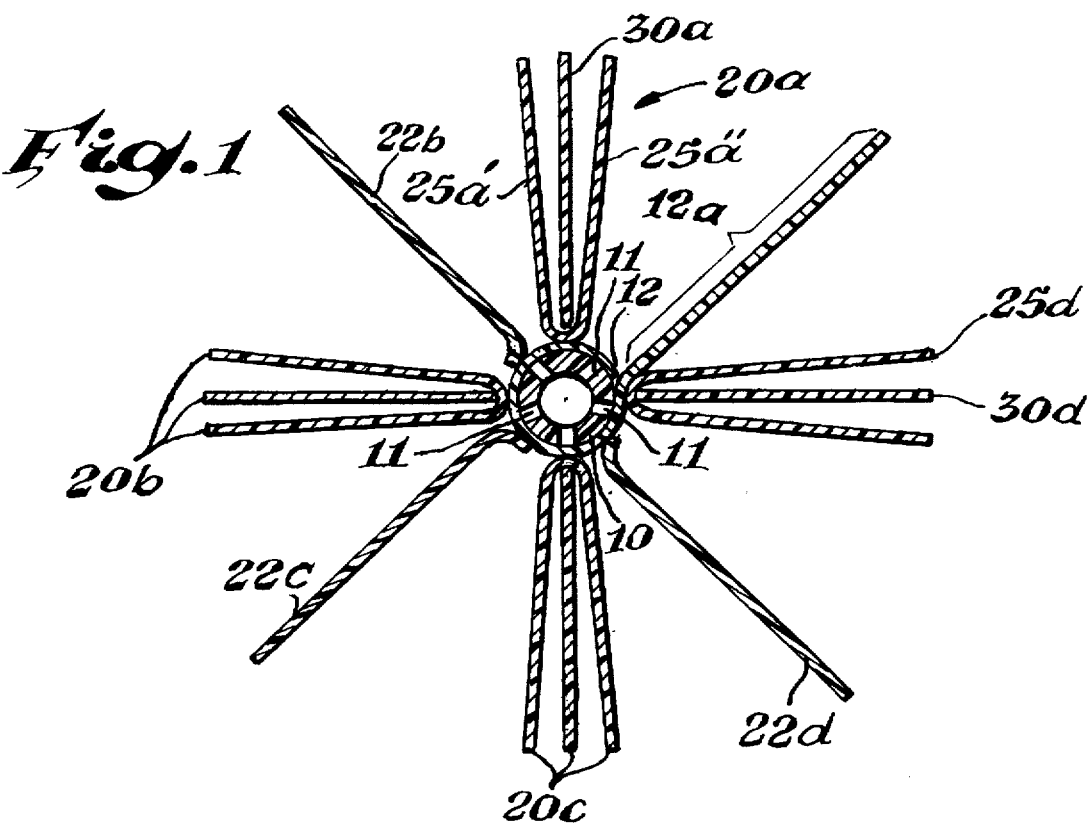
FIG. 1 is a cross sectional view of a prior art spiral wound filter assembly showing the various layers in a radially extended arrangement.
Figure 2:
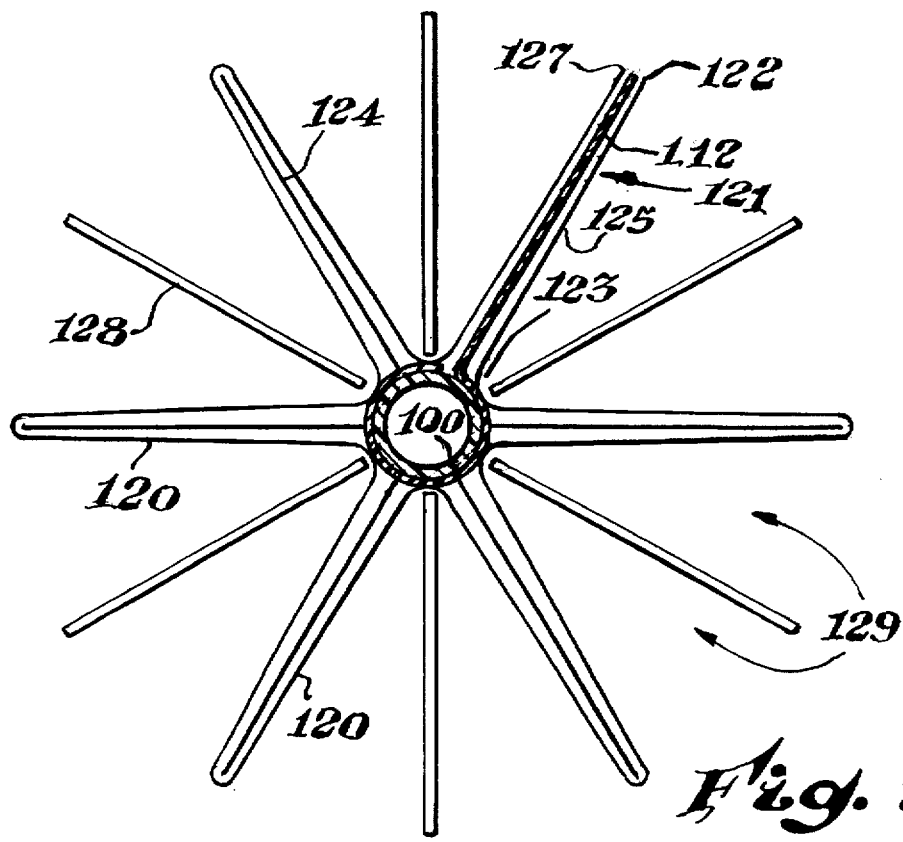
FIG. 2 is a cross sectional view of a prior art petal leaf filter assembly showing the various layers in a radially extended arrangement.

The invention and the improvements it so provides over the prior art are discussed with reference to the accompanying drawings and appended claims.

FIGS. 3(a)–(e) illustrates schematically an embodiment of the present method invention for forming a membrane into a predetermined shape. The membrane is composed of at least a thin, dense active layer and at least one supporting layer attached to the active layer. Illustrated in FIGS. 3(a)–(e) is a membrane sheet 26 having an active layer 27 attached to a supporting layer 29. Flexibility of a given membrane is controlled by such factors as active and supporting layer thicknesses and elasticity modulus of the polymeric compositions incorporated into the layers. A flexible membrane sheet requires less stringent softening means in order to form the membrane into a three dimensional predetermined shape. The membrane sheet 26 has a front edge 31 and a back edge 33.

Figure 3A:
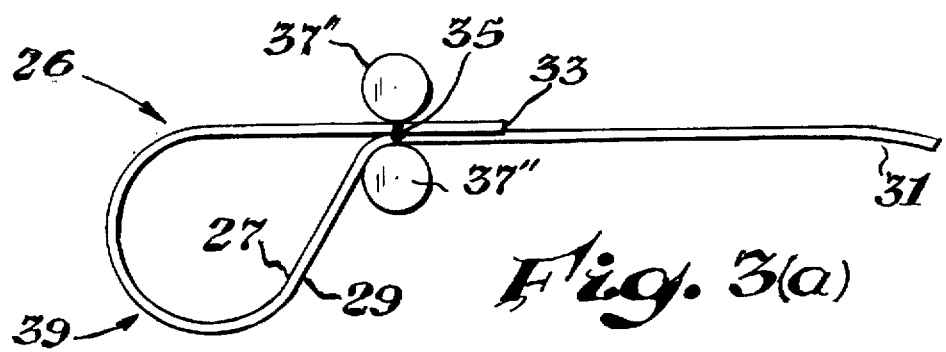
FIG. 3 is a schematic diagram illustrating an embodiment of the invention for forming a membrane into a predetermined shape through a constricting space. Various components are not shown to scale for visual clarity.

In reference to FIG. 3(a), the front edge 31 and the back edge 33 of the membrane sheet 26 are both inserted into a space 35 defined by at least two constricting structures 37' and 37", thereby creating a loop 39 in the membrane sheet 26, such that the active layer 27 either defines the convex or concave surface of the loop 39. Since it is an object of the invention to prevent cracking and other types of damage to the active layer it is preferred that the active layer 27 define the concave surface of the loop 39 since the concave surface does not contact the constricting structures 37' and 37". Damage to the active layer is likely by contacting it with other materials, especially those which are coarser and harder than the active layer composition. The front edge 31 and the back edge 33 are tensioned and forced beyond the constricting structures 37' and 37", thereby reducing the diameter of the loop 39. It is also preferred that the membrane sheet 26 be presized for the desired application, since subsequent shaping or cutting is likely to damage the active layer 27. It is more preferred that the front edge 31 and the back edge 33 be inserted into the space 35 and moved concurrently so as to maintain the distance between the front 31 and back 33 edges (this embodiment not shown).

Figure 3B:
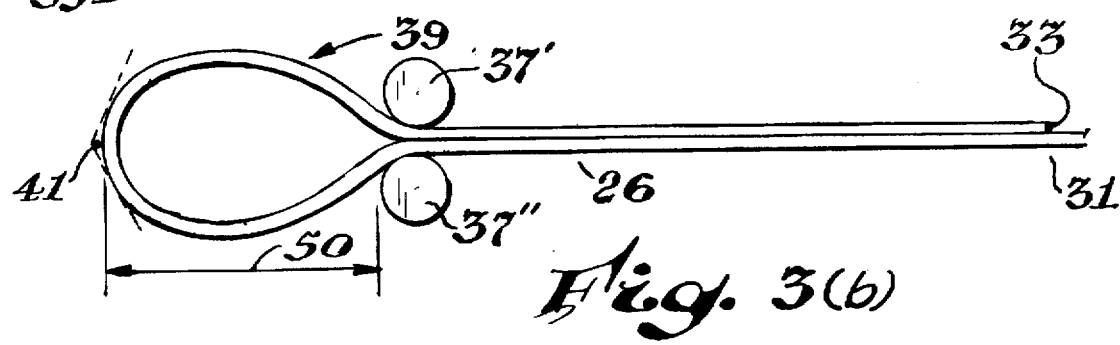

The edges 31 and 33 are further moved away from the constricting structures 37', 37" as shown in FIG. 3(b), thereby reducing the diameter of the loop 39 until just before the angle of curvature, $\theta$, equals the critical angle of curvature, $\theta_c$. The angle of curvature, $\theta$, is defined as the minimal angle formed by tangents to the loop exterior about the point on the loop convex surface 41 geometrically farthest removed from the center of space 35 defined by the constricting structures 37' and 37". The critical angle of curvature, $\theta_c$, is defined as the angle of curvature at which non-reversible deformation of the membrane material occurs. Microcracking associated with tensioning is an illustrative example of such non-reversible deformation. Exceeding $\theta_c$ without softening the membrane loop 39 results in damage, especially about point 41 and thus requires adhesive sealants to isolate this region of membrane from inlet liquid.

Figure 3C:
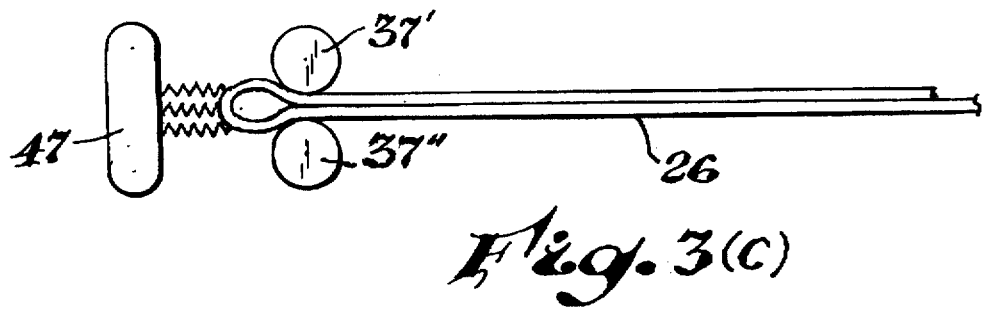

The $\theta_c$ of the loop is decreased by application of a softening means 47 as shown in FIG. 3(c). The softening means may be thermal energy generated illustratively by resistively heating an element, photon absorption, or heat transfer from a gas or liquid medium. The membrane must be heated to a temperature sufficient to cause the polymeric material to flow under the influence of force instead of tearing. Heating the membrane to between 90 percent and 120 percent of the glass transition temperature in degrees Kelvin of the active layer allows the membrane to flow under the influence of external force. The higher the temperature to which the membrane is subjected in order to cause flow, the less time is required to allow for the flow behavior to occur. Heating beyond the glass transition temperature must be done cautiously to prevent excessive thinning of the membrane in the regions of greatest strain. Thus, in a preferred embodiment the membrane is heated to between about 100 percent and 110 percent of the glass transition temperature in degrees Kelvin of the active layer. For the preferred polyamide active layer membranes derived from a monocyclic di-primary amine such as phenylene diamine and a monocyclic di- or tri-acid chloride such as trimesoyl chloride, this corresponds to heating to a temperature between about 350° K. to 420° K. After cooling the membrane below about 85 percent of the glass transition temperature, the angle of curvature of the membrane may be decreased only slowly without introducing microcracks into the membrane.

Alternatively, the softening means may be a solvent capable of causing the membrane active and supporting layers to swell. Solvent softening is accomplished by spraying or covering the loop 39 of the membrane 26 with the solvent. For example, polyamide-polysulfone laminates swell in the presence of solvents with dielectric constants greater than about 2 in general, and specifically in the presence of polar aprotic solvents like dimethyl formamide, aprotic oxygen containing solvents like ethers and ketones; alcoholic solvents like glycerin and methanol; halogenated hydrocarbons like methylene chloride; steam and hot water. As $\theta_c$ decreases due to exposure to the softening means 47, the loop diameter 50 is reduced by tensioning the membrane 26 and forcing more membrane beyond the constricting structures 37' and 37". Optionally, an aperture (not shown) may be inserted between the softening means 47 and the loop 39 to direct the thermal energy or swelling solvent to a controlled area of membrane.

Figure 3D:
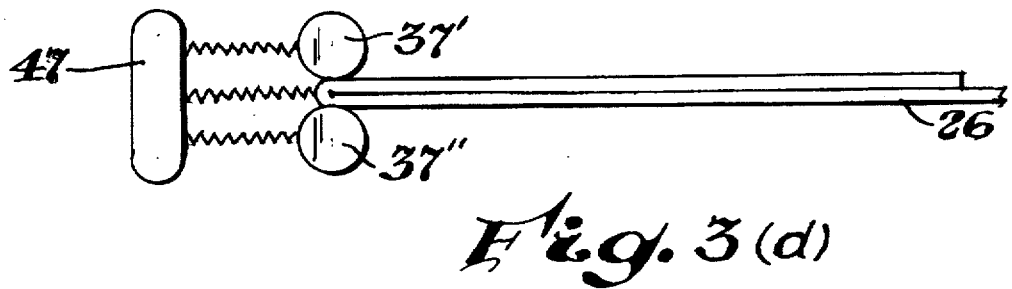

The application of the softening means 47 continues until the loop 39 is forced between the constricting structures 37' and 37", as shown in FIG. 3(d). The softening means may optionally be applied simultaneously with the movement of the membrane loop through the constricting structures. The exposure to the softening means is preferably discontinued after the formed membrane passes the constricting structures 37' and 37". Continued exposure to the softening means may result in undesired warpage due to the polymeric material of the membrane continuing to flow without a constriction to define the shape.

Figure 3E:
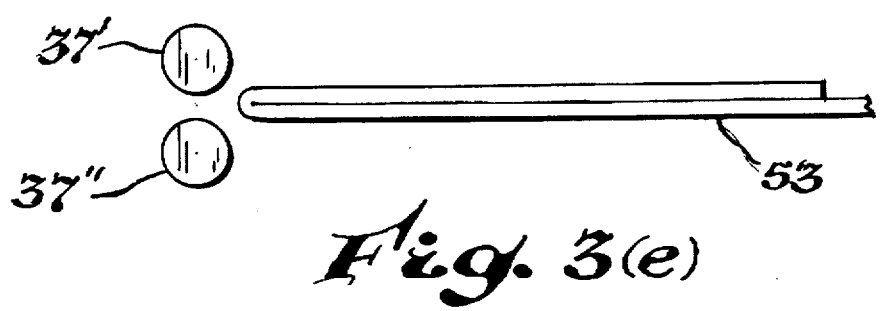

The formed membrane 53 is cooled or the solvent is driven from membrane, depending on the nature of the softening means, and removed from the space 35 between the constricting structures, as shown in FIG. 3(e). The formed membrane 53 is optionally annealed at a temperature between about 80 and 100 percent of the glass transition temperature in degrees Kelvin, of the active layer. It is appreciated that the constricting structures depicted in FIGS. 3(a)–(e) may take a variety of shapes and configurations and still be within the inventive concept. For example, constricting plates are well suited to maintain a predetermined displacement between the formed membrane leaves adjoining the front and back edges. Regardless of the specific shape and design of the constricting structures, it is preferred that constricting structure surfaces that contact the membrane loop be free from acute angles which may damage the convex membrane surface. Optionally, the structures that contact the membrane sheet may be coated with polymeric materials such as TEFLON™, silicone-based materials, and the like to lessen membrane abrasion.

A feedstock sheet may optionally be included in the space between the constricting structures and between the concave surface of the membrane prior to the forming of the membrane into a predetermined shape. The inclusion of the permeate layer during the forming process serves to further support the membrane as the loop diameter is reduced and may further serve to define the dimensions of the space between the constricting structures.

In reference to FIGS. 4(a)–(d), an embodiment of the invention is detailed which is especially useful in forming a membrane to a predetermined shape wherein the delicate active layer defines the exterior convex surface of the formed membrane leaves. The front edge 61 and the back edge 63 of a membrane sheet 56 having a supporting layer 67 and an active layer 66 are brought into proximity about a mandrel 65, thereby creating a loop 68 of diameter 73, FIG. 4(a). It is appreciated that the edges 61 and 63 may be displaced from one another so long as the mandrel 65 is within a concave portion formed by the membrane 56. It is preferred that the active layer 66 define the convex surface of the loop 68 in order to avoid damaging the active layer 66 through contact with the mandrel 65.

By displacing the edges 61 and 63 of the membrane sheet 56 away from the mandrel 65, the mandrel contacts the concave surface of the membrane 56 at a point 69 about which the angle of curvature is defined, FIG. 4(b). It is appreciated that the mandrel 65 may take a variety of shapes and still be within the inventive concept, although it is preferred that to avoid damage to the membrane that the mandrel 65 has generally smooth surfaces and even more preferably that the mandrel has no acute angles against which the membrane sheet 56 is forced. A softening means 71 is applied to the membrane loop 68 which is centered around point 69 until the loop diameter 73 is decreased to a predetermined width, which cannot be decreased to a width smaller than that of mandrel 65, FIG. 4(c). The softening means 71 is comparable to that discussed in reference to FIG. 3. The softening means may be applied to the convex surface 66 of the membrane sheet 56, as depicted in FIG. 3 and FIG. 4(c). It is preferred that an aperture (not shown) may be inserted between the softening means 71 and the loop 68 to direct the thermal energy or swelling solvent to a controlled area of membrane directed about the point 69.

Alternatively, the softening means may be applied to the concave membrane surface through the mandrel or adjacent to the mandrel. The mandrel incorporating a softening means may be heated throughout or only in selected portions or may have channels through which a swelling solvent is communicated to the membrane sheet. Incorporating a softening means into the mandrel or adjacent to the mandrel does not subject the convex surface to heat or solvent which might damage the convex surface layer. It is preferred in this embodiment that the convex surface comprise the active membrane layer.

The formed membrane 75 is removed from the softening source 71 and mandrel 65, as shown in FIG. 4(d). The formed membrane 75 is optionally annealed at a temperature between about 80 and 100 percent of the glass transition temperature in degrees Kelvin, of the active layer. It is appreciated that an additional sheet, such as a permeate spacer sheet may be inserted when the loop 68 is formed such the formed membrane folds around the additional sheet.

In the process of reducing the angle of curvature, the membrane must be pushed or pulled or a combination thereof against constricting structures or a mandrel, FIG. 5. A loop of membrane material may be pushed into a constricting space 599 by deploying a scoop 500. A scoop or pull rod may also be used in concert with a mandrel form (not shown). A loop 501 is created in the membrane sheet 502, with the edges 503 extending from between a plurality of constricting plates 504 having loop-facing front walls 577. The loop 501 is engaged in the region surrounding the point of minimal angle of curvature 505 by the contact face 506 of the scoop 500. The scoop 500 is driven towards the space 599 between the constricting plates 504 by a variety of means including, but not limited to, hydraulic, worm gear and manual, thereby pushing the loop 501 into the space 599.

The scoop optionally has recesses 508 in the contact face 506 that compliment the loop-facing front walls of the constricting plates 504, thereby facilitating the scoop 500 being driven further into the space 599.

The softening means required to decrease the critical angle of curvature prior to the loop diameter being reduced may be inserted into the scoop in a manner described in relation to FIG. 4. Alternatively, the softening means may be independent of the scoop, as described in relation to FIG. 3.

An embodiment of the invention in which the membrane loop is not forced through a set of constricting structures in order to form the membrane to a predetermined shape is depicted schematically in FIGS. 6(a)–(d). A loop 239 is formed in a membrane sheet 226 by inserting the front edge 231 and back edge 233 of the membrane sheet into a space 235 defined by at least two constricting structures 237', 237", FIG. 6(a). The loop diameter is reduced to until just before the angle of curvature of the membrane sheet 202 equals the critical angle of curvature. Loop formation as detailed in reference to FIGS. 3(a) and 3(b) is applicable to the instant embodiment. The membrane 226 is held in selective alignment by means of a suction which is drawn through holes 110 in the constricting structures 237', 237" and directed into the space 235. It is appreciated that adhesives may also serve as an effective alignment means. The alignment means serves to maintain the relative position of the membrane within the apparatus during the reduction of the loop diameter. A structure that is capable of aligning a membrane sheet by only contacting one side of the sheet is useful in the instant invention because it avoids damage to the second side of the sheet. The second side of the sheet is preferably composed of the active layer.

Figure 6:
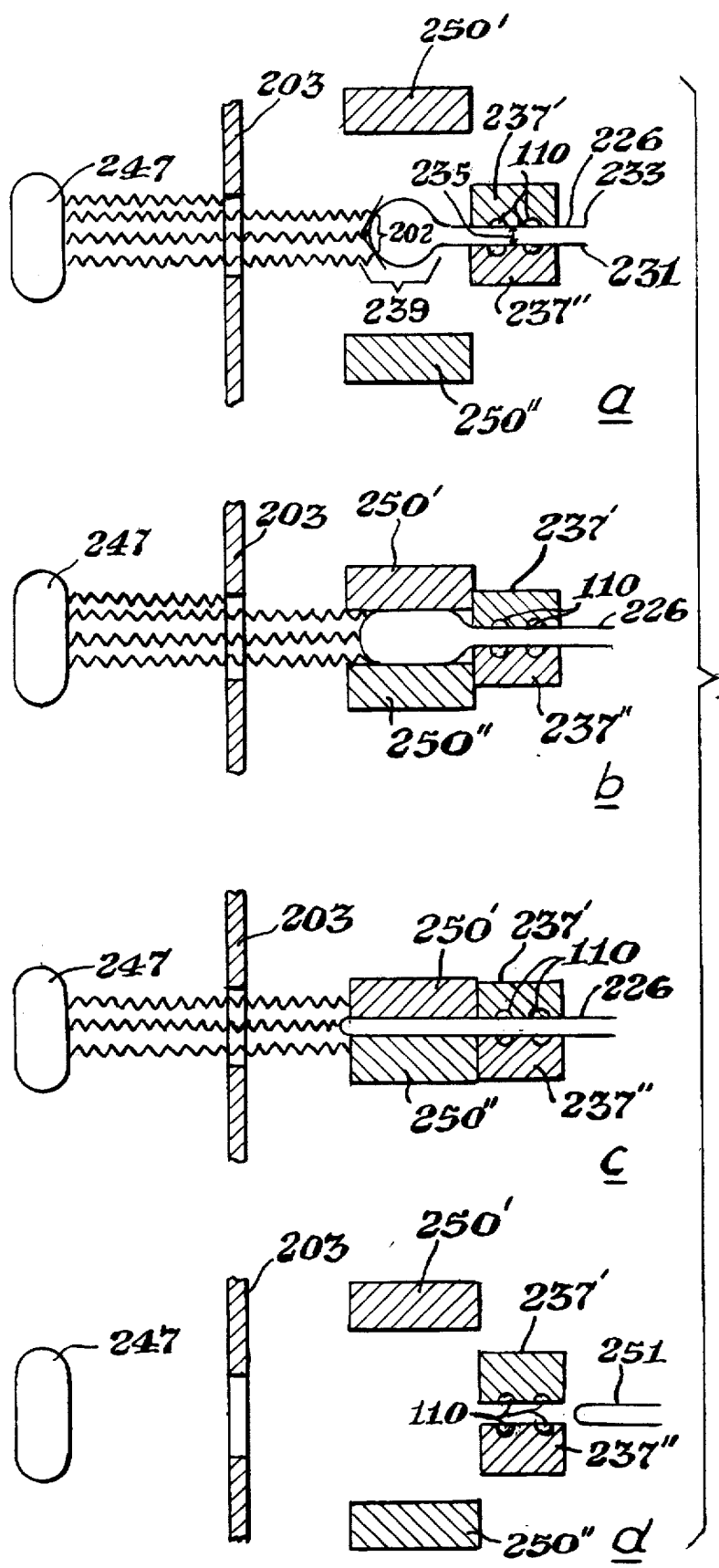
FIG. 6 is a schematic diagram illustrating a further embodiment of the invention for forming a membrane into a predetermined shape through die compression. Various components are not shown to scale for visual clarity.

A softening means 247 is applied to the membrane sheet 226 with a loop 239 having an angle of curvature 202 slightly greater than the critical angle of curvature, FIG. 6(a). The softening means, as described in reference to FIG. 3 is either a thermal energy source or a swelling solvent. It is preferred that an aperture 203 be placed between the softening means 247 and the membrane loop 239 so as to direct the softening effects only to a selected region of the membrane.

A plurality of compression dies 250', 250" borders the membrane loop 239 without exerting any forces on the membrane loop prior to the critical angle of curvature being reduced by application of the softening means 247. Preferably, the compression dies 250', 250" are coplanar plates that are of sufficient size to encompass the membrane loop regardless of the angle of curvature.

As the softening means 247 causes the critical angle of curvature of the loop 239 to decrease, the compression dies 250', 250" place the loop 239 under compressive tension at a rate such that the angle of curvature does not exceed the critical angle of curvature, FIG. 6(b). The compression dies 250', 250" continue to compress and elongate the loop 239 under the influence of the softening means 247, until the angle of curvature of the loop reaches a predetermined value, FIG. 6(c).

The membrane sheet formed to a predetermined shape 251 is then removed from exposure to the softening means 247, the compression dies 250', 250" and the alignment means containing constricting structures 237', 237", FIG. 6(d). The formed membrane 251 is optionally annealed at a temperature between about 80 and 100 percent of the glass transition temperature in degrees Kelvin, of the active layer.

It is appreciated that the use of the various embodiments detailed herein may be combined to place numerous folds within a single membrane sheet. As an illustrative example, the preferred embodiments of FIGS. 3 and 4 may by applied to a single sheet of membrane to create an accordion folded membrane, wherein the folds alternate between such that the active layer is on the convex surface of a fold of the membrane and the active layer is on the concave surface of the adjacent fold of the membrane. This series of accordion folds may be performed using the instant invention without contacting the active layer with process equipment surfaces. Petal leaf cartridges have previously been difficult to produce since alignment errors in making a series of folds and adding adhesive sealant to the fold regions tended to cause membrane deformation upon attachment to the central tube. The current invention largely overcomes these difficulties.

It is a feature of the current invention that a fold may be made in a single sheet of membrane without damage to the active layer, making the use of adhesive sealant unnecessary. A fold may be made so that the active layer defines either the concave or convex surface of the formed membrane. This current invention has application in general for forming membrane sheets and specifically for making both spiral wound cartridges of sandwich or petal leaf configurations. It is understood that in conjunction with the folding methods of the instant invention, additional configurations, and softening means other than those described herein may be employed without departing from the spirit of the invention.

The following examples disclose specific, illustrative methods of the instant invention, which are not intended to limit the scope of the invention.

EXAMPLE 1

A 0.15 millimeter (mm) thick square sheet laminate membrane measuring 101 centimeter (cm) per side is marked with a pencil line on the backing layer from about the middle of one side to about the middle of the opposing side. The membrane sheet is comprised of a poly (phenyldiamine trimesamide) active layer, an intermediate polysulfone layer with average molecular weight of about 40,000 and a backing layer of polyethylene felt composed of about 3 micron (μ) diameter fibers. Two additional pencil guide lines are made on the membrane sheet 15 cm on either side of the original line. The corners of the square membrane sheet are brought together to form a loop with the backing layer and the pencil lines thereon being visible. The open end of the membrane loop is slipped between two gapped steel plates that are 101 cm long and 2.5 cm wide. The gap between the steel plates is 1 mm. The active polyamide layer thus does not contact the plates. The membrane sheet is pulled through the plates until the pencil guide lines are in contact with the plates. The membrane loop is exposed to the exhaust from a heat gun. As the membrane begins to soften under the exposure to hot air, the membrane loop is gradually drawn taut by manually pulling more membrane sheet through the plates. Finally, the membrane is pulled completely through the plates and allowed to cool. A fold in the membrane results with dimensions predetermined by the gap width between the plates.

The formed membrane is then tested by placing an aqueous dye solution of bromophenol blue on the active side of the membrane. No dye is observed to diffuse to the backing side of the membrane indicating that the microcracking at the fold line is minimal.

The process is repeated with several sheets of membrane material and the resulting formed membranes are assembled to form a spiral wound filter cartridge using techniques common to the art.

EXAMPLE 2

A membrane sheet is marked and inserted between plates as detailed in Example 1. The membrane loop is immersed in a trough of methylene chloride. As the membrane begins to soften under the exposure to the solvent, the membrane loop is gradually drawn taut by pulling more membrane sheet through the plates. Finally, the membrane is pulled completely through the plates and allowed to dry. A fold in the membrane results with dimensions predetermined by the gap width between the plates.

The integrity of the fold is tested and the resulting membrane is used to assemble a spiral wound filter as detailed in Example 1.

EXAMPLE 3

A membrane sheet 700 cm long and 101 cm wide is marked with a single pencil line as described in Example 1, 51 cm from the narrow end. A loop is formed about a mandrel by bringing the corners of the sheet together such that the backing layer and the pencil line are on the interior of the loop. The mandrel is a stainless steel cannula needle into the sides of which apertures are cut and the end sealed. The outer diameter of the mandrel is about 0.8 mm. Air heated to about 100° C. is forced through the apertures in the mandrel. The exterior of the loop is also heated as described in Example 1 to speed the folding process. The pencil line is brought into contact with the mandrel. As the membrane begins to soften under the exposure to the hot air, the membrane loop is gradually drawn taut against the mandrel. A fold in the membrane results with dimensions predetermined by the outer diameter of the mandrel.

The process is repeated six times at intervals of 101 cm over the length of the sheet. The process as detailed in Example 1 is similarly repeated at intervals on the same sheet, resulting in accordion folds along the membrane sheet.

The integrity of the folds is tested by exposing the active layer to an aqueous dye solution of bromophenol blue and examining the backing layer for traces of dye. No dye is observed to diffuse to the backing side of the membrane indicating that the microcracking at the fold lines is minimal.

The resulting formed membrane is employed to assemble a petal leaf spiral wound cartridge by methods common to the art.

EXAMPLE 4

A membrane sheet is marked as described in Example 1. The guide lines are aligned with two vacuum holding bars measuring 110 cm in length and 10 cm in width. The vacuum is then activated and the backing layer of the membrane is held in position against the vacuum holding bars. Two compression dies which are positioned on either side of the membrane loop are then brought to an intermediate position without actually contacting the membrane loop. An electric heating element is brought close to the exterior of the membrane loop and energized for several seconds. The heating element temperature is preselected between 80° and 700° C. The heating element is then disengaged and the compression dies are brought into proximity about the loop until they contact a radius adjusting shim. The membrane is cooled and the compression dies and vacuum holding bars are disengaged resulting in a membrane formed to a predetermined shape.

The integrity of the fold is tested and the resulting membrane is used to assemble a spiral wound filter as detailed in Example 1.

What is claimed is:

1. A method for folding a polymeric membrane comprising:
   (a) forming a polymeric membrane, having a supporting layer, an active layer, a front end and a back end, into a loop;
   (b) softening said loop by means of a softening source until said loop is adapted for drawing down to a fold;
   (c) drawing said loop to said fold; and
   (d) removing said fold from said softening source.

2. The method of claim 1 wherein the forming of a loop occurs adjacent to constricting structures having a space therebetween such that the supporting layer contacts said constricting structures and the front end and back end extend through the space between the constricting structures.

3. The method of claim 2 wherein said fold is defined by the space between the constricting structures.

4. The method of claim 2 wherein said constricting structures further contain a means for holding said membrane in a selectively aligned position.

5. The method of claim 2 wherein drawing down said loop is accomplished by compressing said loop into said constricting structures space by means of a moveable scoop.

6. The method of claim 2 wherein said constricting structures are maintained at a temperature below about 85 percent of the glass transition temperature in degrees Kelvin of the active layer.

7. The method of claim 1 further comprising the step of inserting a sheet of permeate or feedstock spacer material into said loop, such that upon said loop being drawn to said fold said sheet is sandwiched therein.

8. The method of claim 1 wherein the means of a softening source is a thermal source.

9. The method of claim 8 wherein the means of a softening source is a thermal source sufficient to raise said loop to a temperature from 90 to 120 percent of the glass transition temperature in degrees Kelvin of the active layer.

10. The method of claim 1 wherein the means of a softening source is a solvent that causes swelling of said membrane wherein said solvent has a dielectric constant greater than about 2.

11. The method of claim 1 further comprising the step of thermally annealing said fold.

12. The method of claim 1 wherein said active layer is a polyamide.

13. The method of claim 1 wherein said supporting layer is a polysulfone.

14. The method of claim 1 wherein said membrane is adapted to perform reverse osmosis separations.

15. The method of claim 1 wherein said membrane is adapted to function in a spiral wound filter.

16. The method of claim 1 wherein the forming of a loop occurs around a mandrel such that the supporting layer contacts said mandrel.

17. The method of claim 16 wherein said softening means is within said mandrel.

18. The method of claim 16 further comprising a means for selectively tensioning said membrane.

19. The method of claim 16 wherein said membrane operates as an element within a petal leaf filter.

20. The method of claim 1 wherein the forming of a loop occurs adjacent to constricting structures having a space therebetween such that the supporting layer contacts said constricting structures and the front end and back end extend through the constricting structures space, and said constricting structures are adapted to selectively align said membrane and said loop is drawn to said fold by means of being compressed between at least two compression dies.

21. A method for folding a polymeric membrane at least twice comprising:

(a) the sequence of steps of:
 (1) forming a polymeric membrane, having a supporting layer, an active layer, a front end and a back end, into a loop adjacent to constricting structures having a space therebetween such that the supporting layer contacts said constricting structures and the front end and back end extend through the space between the constricting structures;
 (2) softening said loop by means of a softening source until said loop is adapted for drawing down to a fold;
 (3) drawing said loop to said fold;
 (4) removing said fold from said softening source; and (b) the sequence of steps of:
 (1) forming a polymeric membrane, having a supporting layer, an active layer, a front end and a back end, into a loop around a mandrel such that the supporting layer contacts said mandrel;
 (2) softening said loop by means of a softening source until said loop is adapted for drawing down to a fold;
 (3) drawing said loop to said fold;
 (4) removing said fold from said softening source.

22. The method of claim 21 wherein the active layer does not contact said forming plates or said mandrel.

23. The method of claim 21 wherein said membrane is folded so as to be adapted to form a petal leaf filter membrane.

* * * * *